May 10, 1927.

M. A. DOELCKNER ET AL 1,628,582

TIRE LINER

Filed Jan. 24, 1925

Max A. Doelckner
Anthony F. Fanelli
INVENTORS

BY *Victor J. Evans*
ATTORNEY

WITNESS:

Patented May 10, 1927.

1,628,582

UNITED STATES PATENT OFFICE.

MAX A. DOELCKNER AND ANTHONY P. FANELLI, OF LOUISVILLE, KENTUCKY.

TIRE LINER.

Application filed January 24, 1925. Serial No. 4,606.

This invention relates to pneumatic tires for vehicles, particularly to attachments or accessories for use in connection therewith, and has for its object the provision of a novel liner adapted to be engaged within a tire casing and so constructed and arranged as to protect the inner tube from being punctured from any cause whatsoever.

An important object is the provision of a device of this character which will be simple and inexpensive in manufacture, easy to apply, positive in action, efficient and durable in service, and a general improvement in the art.

Figure 1:
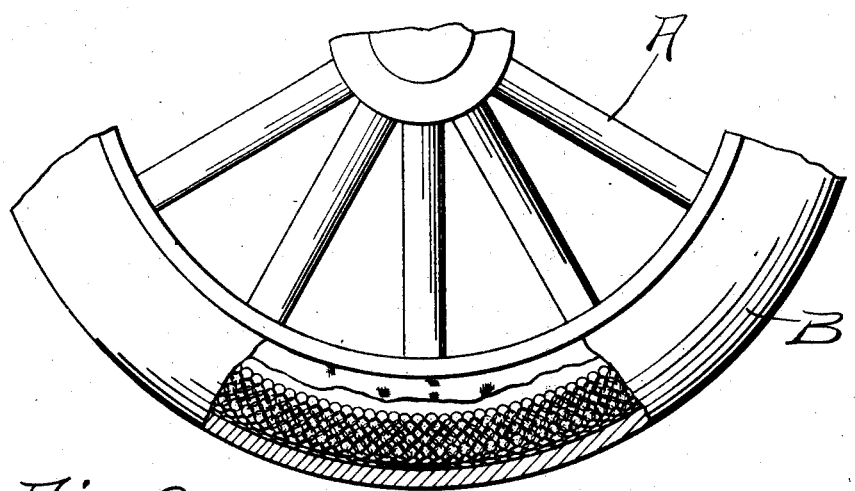
Figure 2:
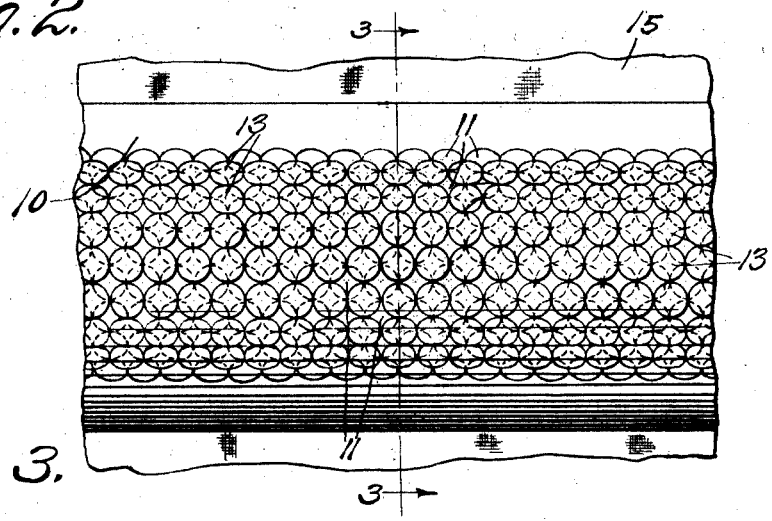
Figure 3:

With the above and other objects and advantages in view, the invention consists in the details of construction to be hereinafter more fully described and claimed, and illustrated in the accompanying drawings, in which:

Figure 1 is a fragmentary elevation of a tire and wheel, a portion of the tire being in section to illustrate the device in position, Figure 2 is a detail view looking at the outside of the liner, Figure 3 is a cross section on the line 3—3 of Figure 2.

Referring more particularly to the drawings, the letter A designates an ordinary vehicle wheel upon which is mounted a pneumatic tube as is customary.

In carrying out the invention we provide a liner for the casing B, which liner is designated broadly by the numeral 10 and consists of a suitable length of flexible material such as fabric, leather or the like provided with a series of rivet-like members 11 which may be of the split type, as indicated in Figure 3 or which may be of any other preferred type, which rivet members are driven into place through the fabric or other flexible material 10 and clinched as indicated at 12 so as to prevent retraction or withdrawal. All of these rivets 11 are arranged in substantially contacting relation and it is of course apparent that there will be small areas between the points of contact of these rivets, which small areas we propose to cover by means of other rivets 13 of the same or any preferred type driven in the same or some other manner.

For the purpose of protecting the tube against injury from the clinched ends 12 of the rivets, we provide an auxiliary liner 14 of fabric or other suitable material located inwardly of the member 10 in such position as to cover the clinched ends of all the rivets and prevent them from ever having any contact with the inner tube. It is preferable that the inside liner 14 have flaps 15 which will project beyond the sides thereof so as to engage between the beads of the tire and the flanges of the rim in order to hold the device properly in shape and consequently effect bracing or reenforcing of a weak casing.

The liner when applied is cemented, vulcanized or otherwise suitably secured to the casing.

As will be seen from an inspection of the drawings, the rivet heads are substantially flat and partially spherical so as to provide sharp edges around the heads. These edges are normally in contacting relation, so that a tire protector is provided which is made up of a number of disk-like members arranged in such manner that it will be practically impossible for a bent nail or like object to work its way between the rivets. By making the heads of the rivets of the shape specified, their sharp edges will permit said heads to ride upon one another when the tread of the tire is forced inward, as when riding over a stone or other obstruction. A flexible metallic substantially puncture proof armor is thus provided.

From the foregoing description and a study of the drawings it will be apparent that we have thus provided a very simple, inexpensive and easily applied device for the purpose specified which will efficiently perform all functions for which it is intended.

While we have shown and described the preferred embodiment of the invention, it should be understood that we reserve the right to make such changes in the form, construction and arrangement of parts as will not depart from the spirit of the invention or the scope of the subjoined claim.

Having thus described the invention, we claim:

A tire liner comprising a continuous member of fabric curved longitudinally and transversely and adapted to be engaged within a pneumatic tire between the casing and inner tube, a plurality of metallic rivets having substantially flat circular partially spherical heads and sharp edges around the heads, said edges being normally arranged in contacting relation throughout the tread portion of the liner, and a plurality of similar rivets similarly located in the spaces between the first named rivets and in overlapping relation thereto with their edges in contacting relation, each of said rivets having a split shank passing through the fabric with its ends clinched at the inner side thereof.

In testimony whereof we affix our signatures.

MAX A. DOELCKNER.
ANTHONY FANELLI.